United States Patent

Harrison

[15] 3,647,013

[45] Mar. 7, 1972

[54] REMOVABLE DRIVE UNIT FOR LIFT TRUCK

[72] Inventor: William J. Harrison, Guelph, Ontario, Canada

[73] Assignee: Allis-Chalmers Manufacturing Company, Milwaukee, Wis.

[22] Filed: June 10, 1970

[21] Appl. No.: 44,945

[52] U.S. Cl.....................................180/13, 293/63, 293/73
[51] Int. Cl..................................................B62d 51/04
[58] Field of Search......................180/13, 26, 52, 65, 31, 19; 280/92; 293/63, 73

[56] References Cited

UNITED STATES PATENTS

| | | |
|---|---|---|
| 2,448,176 | 8/1948 | Funk.................................180/26 X |
| 860,251 | 7/1907 | Schmoele..............................180/31 |
| 1,346,915 | 7/1920 | Sauvage................................180/26 |
| 2,630,186 | 3/1953 | Joy....................................180/65 X |
| 2,762,444 | 9/1956 | Gardner...............................180/13 |
| 2,942,679 | 6/1960 | Gibson................................180/65 |
| 3,362,497 | 1/1968 | Nichols.............................180/65 X |

*Primary Examiner*—Kenneth H. Betts
*Attorney*—Charles L. Schwab, Robert B. Benson and Kenneth C. McKivett

[57] ABSTRACT

The drive unit of a material-handling truck is removable from the frame of the truck upon removal of a bumper and release of upper and lower bearing securing means.

13 Claims, 3 Drawing Figures

PATENTED MAR 7 1972

3,647,013

Inventor
William I. Harrison
By Charles L. Schwab
Attorneys

REMOVABLE DRIVE UNIT FOR LIFT TRUCK

This invention relates to a material-handling truck having a drive unit which is readily removable from the truck thereby greatly facilitating replacement and repair.

It is an object of the present invention to provide an easily removable drive unit for a truck.

It is a further object of this invention to provide material handling truck wherein the drive unit is releasably secured to the truck frame at vertically spaced points and a bumper is removable to facilitate removal of the drive unit.

It is a further object of this invention to provide a drive unit including a steerable motor wheel and control handle which is removable as an assembly from a lift truck frame, to which releasably and pivotally secured.

These and other objects and advantages of this invention will be apparent when the following description is read in conjunction with the drawings in which.

Figure 1:
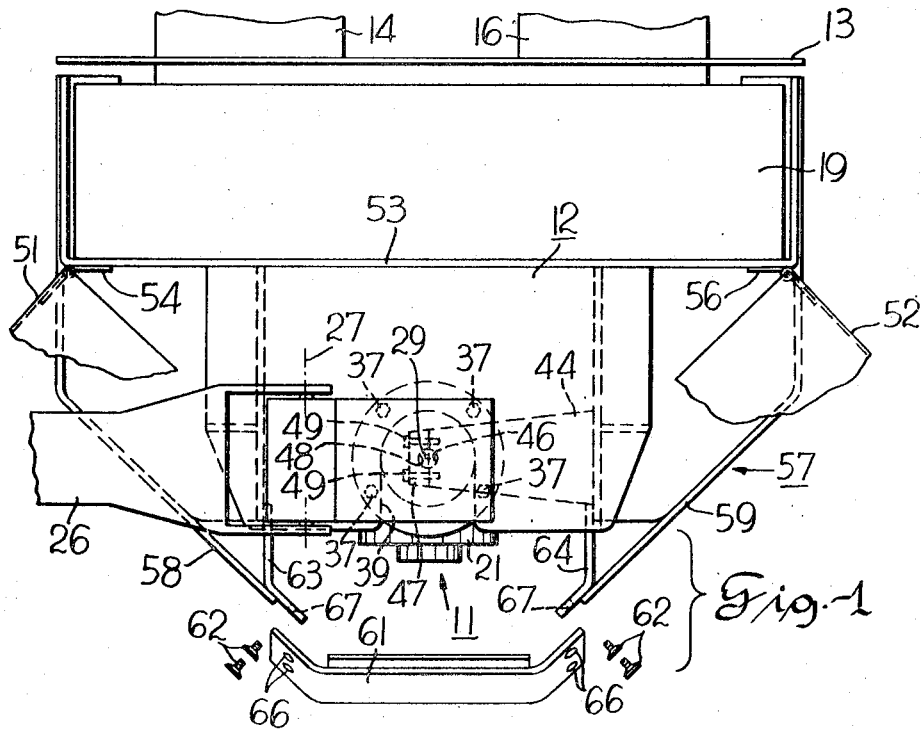
FIG. 1 is a top view of a lift truck incorporating the present invention.
Figures 2, 3:
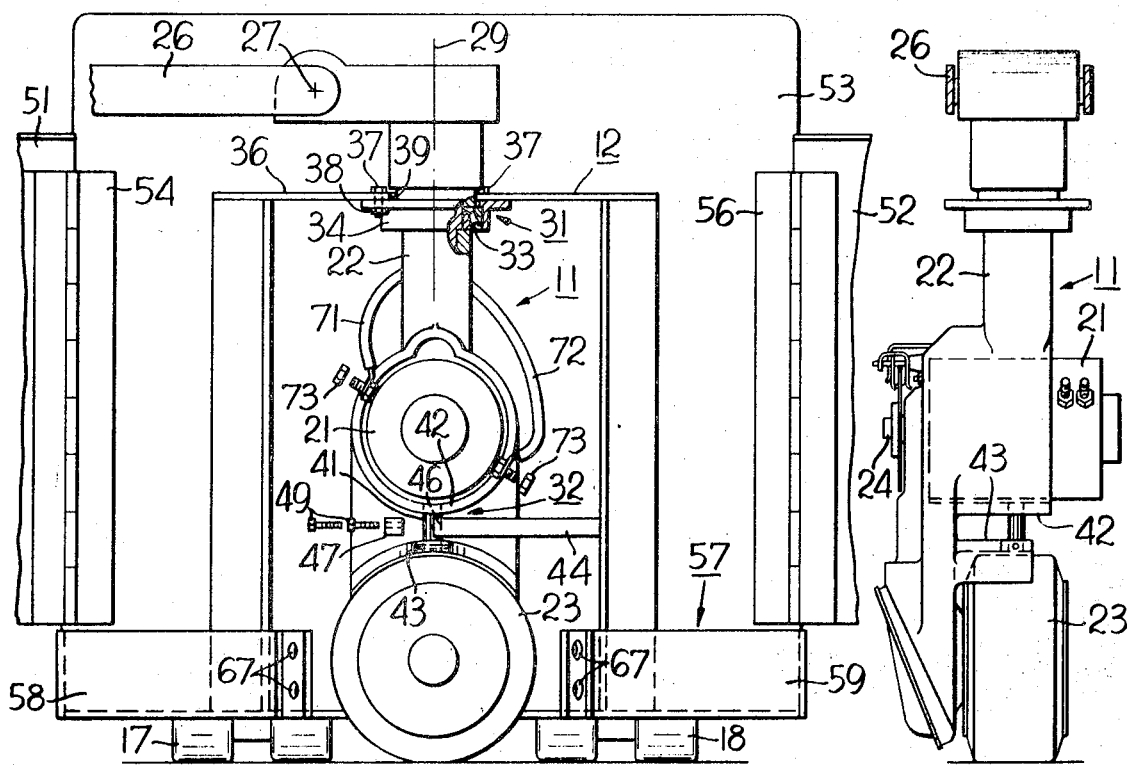
FIG. 2 is a front view of the truck shown in FIG. 1.
FIG. 3 is an elevation view of the drive unit removed from the truck.

Referring to FIGS. 1 and 2 a drive unit 11 is shown in a material-handling truck in the form of a walkie lift truck which includes a frame 12 and an elevating platform 13 having a pair of forks 14, 16 supported at their rear ends by dual wheel assemblies 17, 18. A battery 19 on the frame 12 supplies energy for driving an electric motor 21 which is mounted on a housing 22 of the drive unit 11. A drive wheel 23 is rotatably carried on the lower end of the housing 22 and is connected through gearing, not shown, to a drive shaft 24 of the motor 21. The upper end of the housing 22 carries a control handle 26 connected thereto for pivotal movement about a horizontal axis 27. The lift truck operator can swing the handle laterally to pivot the drive unit 11 about a vertical steer axis 29 on which the unit is supported on the frame 12 by vertically spaced means 31, 32.

The upper bearing means 31 includes a thrust bearing 33 interposed between a shoulder of bearing retainer 34 and a shoulder on housing 22. The bearing 33 is a roller bearing designed for combined radial and axial loads. The bearing retainer 34 is releasably secured to a horizontal wall 36 of the frame 12 by releasable fastening means in the form of four bolts 37 and four nuts 38. The wall 36 has a slot 39 which permits horizontal removal of the drive unit 11, when the bolts 37 are removed. The lower bearing means 32 includes a pin 41 carried by vertically spaced walls 42, 43 of the drive unit and a split bearing on the frame 12 comprising an end portion of a bracket 44 presenting a cylindrically formed bearing surface 46 and a bearing part in the form of a bearing cap 47 presenting a cylindrically formed bearing surface 48. The cap 47 is releasably secured to the bracket 44 by releasable fastening means in the form of cap screws 49.

A pair of doors 51, 52 are pivotally connected on vertical axes to a vertical wall 53 of the frame 12 by hinges 54, 56, respectively. In FIG. 1 the doors are shown in their partially open position. A guard rail structure 57 is provided on the frame 12 below the doors. Lateral side portions 58, 59 of the guard structure 57 are rigidly secured to other components of the frame 12 and the central front portion of the guard structure comprises a bumper 61 which is releasably secured to the frame 12 by four cap screws 62, shown withdrawn in FIG. 1. The bumper 61 is secured to frame members 63, 64 by extending the screws through openings 66 in the bumper 61 and screwing their threaded ends into internally threaded openings 67 in the frame 12.

When it is desired to remove the drive unit 11 from the frame 12, the doors 51, 52 are opened, the electrical leads, including motor power leads 71, 72, are released as by removing nuts 73, the releasable bumper 61 is removed by disengaging screws 62, the releasable fastening means 37, 38 for the bearing retainer 31 are removed, and with the drive unit 11 turned to the 90 degree from straight ahead position, as shown in FIGS. 1 and 2, the releasable fastening means 49 for cap 47 are removed. The drive unit 11 may now be removed by supporting the frame on a block or jack, not shown, swinging the lower end of the unit slightly to the left, as viewed in FIGS. 1 and 2, and, with the drive unit turned to a straight ahead drive position, moving the unit forwardly through the opening provided in the guard rail structure when the bumper 61 is removed.

From the foregoing description, it is apparent that an extremely convenient drive unit 11 and lift truck frame construction is provided which permits the drive unit to be replaced as a unit or removed from the truck temporarily for repairs. The illustrated construction is also desirable from a manufacturing standpoint in that the frame 12 and the drive unit 11 can be manufactured on different assembly lines and then assembled on the main assembly line in the final stages of manufacture.

The embodiments of the invention in which an exclusive property or privilege is claimed are defined as follows:

1. In a material-handling truck of the type having a frame and a steerable drive unit at its front end with a control handle, motor and drive wheel, the combination comprising:
   upper bearing means between said frame and said drive unit including a bearing retainer,
   means releasably securing said bearing retainer to said frame including a plurality of threaded fastening members,
   lower bearing means between said frame and drive unit including a bearing part releasably secured to said frame, and
   a front bumper releasably secured to said frame, said drive unit being removable from said frame upon release of said bumper, upper bearing means and bearing part.

2. The invention of claim 1 wherein said bearing part is a bearing cap.

3. The invention of claim 1 wherein said frame includes a horizontal wall presenting a slot into and out of which said drive unit may be moved and wherein said bearing retainer is releasably secured to said horizontal wall.

4. The invention of claim 3 wherein said bearing part is a bearing cap presenting a cylindrically formed bearing surface.

5. In a material-handling truck of the type having a frame and a steerable drive unit at its front end with a control handle, motor and drive wheel, the combination comprising:
   a horizontal wall on said frame presenting a slot in which said drive unit is disposed,
   upper bearing means between said horizontal wall and said drive unit,
   means releasably securing said bearing means to said horizontal wall so as to permit said drive unit to be moved into and out of said slot, and
   lower bearing means between said frame and drive unit including a bearing part releasably secured to said frame, said drive unit being removable from said frame upon release of said upper bearing means and said bearing part.

6. The invention of claim 5 wherein said upper bearing means includes a bearing retainer and said means releasably securing said bearing means to said frame includes a plurality of threaded fastening members releasably securing said bearing retainer to said horizontal wall.

7. The invention of claim 5 wherein said bearing part is a bearing cap.

8. In a material-handling truck of the type having a frame and a steerable drive unit at its front end with a control handle, motor and drive wheel, the combination comprising:
   upper bearing means between said frame and said drive unit,
   means releasably securing said bearing means to said frame,
   lower bearing means between said frame and drive unit including a bearing part releasably secured to said frame, and
   a guard structure on the lower front and sides of said frame including a detachable front portion releasably secured thereto, said drive unit being removable from said frame upon release of said front portion, upper bearing means and bearing part.

9. The invention of claim 8 wherein said upper bearing means includes a bearing retainer and said means releasably securing said bearing means to said frame includes a plurality of threaded fastening members.

10. The invention of claim 8 wherein said bearing part is a bearing cap.

11. The invention of claim 8 wherein said frame includes a horizontal wall presenting a slot into and out of which said drive unit may be moved and wherein said upper bearing means are releasably secured to said horizontal wall.

12. The invention of claim 11 wherein said upper bearing means includes a bearing retainer releasably secured to said horizontal wall.

13. The invention of claim 12 wherein said bearing part is a bearing cap presenting a cylindrically formed bearing surface.

* * * * *